US010163577B2

(12) United States Patent
McCurry et al.

(10) Patent No.: US 10,163,577 B2
(45) Date of Patent: Dec. 25, 2018

(54) ALUMINUM ELECTROLYTIC CAPACITOR AND ASSEMBLY THEREOF

(71) Applicant: Pacesetter, Inc., San Jose, CA (US)

(72) Inventors: Troy L. McCurry, West Union, SC (US); Ralph Jason Hemphill, Sunset, SC (US); David R. Bowen, Taylors, SC (US); Peter J. Fernstrom, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 148 days.

(21) Appl. No.: 15/221,891

(22) Filed: Jul. 28, 2016

(65) Prior Publication Data

US 2018/0033561 A1 Feb. 1, 2018

(51) Int. Cl.
| | |
|---|---|
| *H01G 9/10* | (2006.01) |
| *H01G 9/00* | (2006.01) |
| *H01G 9/08* | (2006.01) |
| *H01G 9/045* | (2006.01) |
| *H01G 9/02* | (2006.01) |
| *H01G 9/055* | (2006.01) |
| *H01G 9/008* | (2006.01) |

(52) U.S. Cl.
CPC .............. *H01G 9/10* (2013.01); *H01G 9/0029* (2013.01); *H01G 9/045* (2013.01); *H01G 9/08* (2013.01); *H01G 9/008* (2013.01); *H01G 9/02* (2013.01); *H01G 9/055* (2013.01)

(58) Field of Classification Search
CPC ........ H01G 9/10; H01G 9/0029; H01G 9/008; H01G 9/08; H01G 9/02; H01G 9/055
See application file for complete search history.

(56) References Cited

U.S. PATENT DOCUMENTS

| | | | |
|---|---|---|---|
| 5,131,388 A | 7/1992 | Pless et al. | |
| 5,786,980 A * | 7/1998 | Evans | H01G 9/08 174/17 GF |
| 5,850,331 A * | 12/1998 | Matsumoto | H01G 9/155 361/502 |
| 5,862,035 A * | 1/1999 | Farahmandi | H01G 9/038 361/502 |
| 6,459,566 B1 * | 10/2002 | Casby | A61N 1/375 361/503 |
| 6,898,066 B1 * | 5/2005 | Lin | H01G 9/06 361/301.3 |
| 7,031,139 B1 * | 4/2006 | Fayram | A61N 1/3975 361/508 |

(Continued)

*Primary Examiner* — David M Sinclair
(74) *Attorney, Agent, or Firm* — Theresa A. Raymer

(57) ABSTRACT

Designs of a capacitor housing and method of assembly are presented. A case for an electrolytic capacitor includes a non-conducting cover, a non-conducting ring component, and a non-conducting plate. The non-conducting cover has a patterned groove on a surface of the non-conducting cover. The non-conducting ring component has a shape that is substantially the same as a shape of the non-conducting cover, and is coupled to the non-conducting cover via the patterned groove of the non-conducting cover. The non-conducting plate has a shape that is substantially the same as the shape of the non-conducting cover, and has a patterned groove on a surface of the non-conducting plate. The non-conducting ring component is coupled to the non-conducting plate via the groove of the non-conducting plate.

22 Claims, 6 Drawing Sheets

(56) References Cited

U.S. PATENT DOCUMENTS

| | | | |
|---|---|---|---|
| 8,611,997 B1* | 12/2013 | McCurry | H01G 9/08 361/518 |
| 9,105,401 B2* | 8/2015 | Dreissig | H01G 9/035 |
| 2005/0243501 A1* | 11/2005 | Muffoletto | H01G 9/06 361/534 |
| 2005/0264979 A1* | 12/2005 | Breyen | A61N 1/375 361/517 |
| 2007/0081298 A1* | 4/2007 | Omura | H01G 9/06 361/502 |
| 2010/0177507 A1* | 7/2010 | West | H01M 2/1055 362/183 |
| 2011/0157774 A1* | 6/2011 | Aitchison | H01G 9/016 361/502 |
| 2016/0049259 A1* | 2/2016 | Naito | H01G 9/012 361/528 |

\* cited by examiner

ALUMINUM ELECTROLYTIC CAPACITOR AND ASSEMBLY THEREOF

FIELD

The present invention relates generally to the field of electrolytic capacitors and batteries.

BACKGROUND

Compact, high voltage capacitors are utilized as energy storage reservoirs in many applications, including implantable medical devices. These capacitors are required to have a high energy density, since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

Stacked electrolytic capacitors are typically constructed with a plurality of anodes and cathodes, which must be separated by a liquid absorbent insulative material, and are impregnated by an electrically conductive electrolyte. If the separator is not present as a line of sight barrier between any anode and adjacent cathode, there exists a danger of physical contact, as well as electrical breakdown of any incidental gasses present in the completed capacitor. Either of these scenarios would result in an undesirable partial or complete discharge event with a high probability of device failure.

Stacked electrolytic capacitors are typically insulated from their surrounding metal case using a boot or Kapton tape. If the separator and/or boot/Kapton tape is not present as a line of sight barrier between any anode and adjacent cathode space or case, there exists a danger of physical contact, as well as electrical breakdown of any incidental gasses present in the completed capacitor due to the close tolerances requisite to achieve a compact part. Either of these scenarios would result in an undesirable partial or complete discharge event, with a high probability of device failure.

Stacked high voltage electrolytic capacitors often utilize physical features in the constituent components of assembly with the aim of assuring precision of physical alignment such that the dimensions of those components leave physical margins that assure adequate separator coverage between all anodes and cathodes. The anodes also have a minimum distance between the anodes and the case wall, which prevents complete packaging efficiency utilization.

BRIEF SUMMARY

Device designs are presented that include a capacitor case design that allows for better packaging efficiency.

According to an embodiment, a case for an electrolytic capacitor includes a non-conducting cover, a non-conducting ring component, and a non-conducting plate. The non-conducting cover has a patterned groove on a surface of the non-conducting cover. The non-conducting ring component has a shape that is substantially the same as a shape of the non-conducting cover, and is coupled to the non-conducting cover via the patterned groove of the non-conducting cover. The non-conducting plate has a shape that is substantially the same as the shape of the non-conducting cover, and has a patterned groove on a surface of the non-conducting plate. The non-conducting ring component is coupled to the non-conducting plate via the groove of the non-conducting plate.

According to an embodiment, an electrolytic capacitor includes a material stack, an electrolyte and a housing that houses the material stack and the electrolyte. The material stack includes at least one anode foil, at least one cathode foil, and at least one separator disposed between adjacent anode and cathode foils. The housing includes a non-conducting cover, a non-conducting ring component, and a non-conducting plate as described above.

According to an embodiment, an example method of assembling a case for an electrolytic capacitor includes coupling a ring component to a separator component via a grooved portion of the separator component, disposing a material stack against the separator component, and coupling the ring component to a base component via a grooved portion of the base component. The material stack is encapsulated by the ring component, the separator component, and the base component.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate a cathode assembly with an integrated separator and a capacitor formed therefrom. Together with the detailed description, the drawings further serve to explain the principles of and to enable a person skilled in the relevant art(s) to make and use the methods and systems presented herein. In the drawings, like reference numbers indicate identical or functionally similar elements. Further, the drawing in which an element first appears is typically indicated by the leftmost digit(s) in the corresponding reference number.

DETAILED DESCRIPTION

The following detailed description of capacitor and battery designs refers to the accompanying drawings that illustrate exemplary embodiments consistent with these devices. Other embodiments are possible, and modifications may be made to the embodiments within the spirit and scope of the methods and systems presented herein. Therefore, the following detailed description is not meant to limit the devices described herein. Rather, the scope of these devices is defined by the appended claims.

Figure 1:
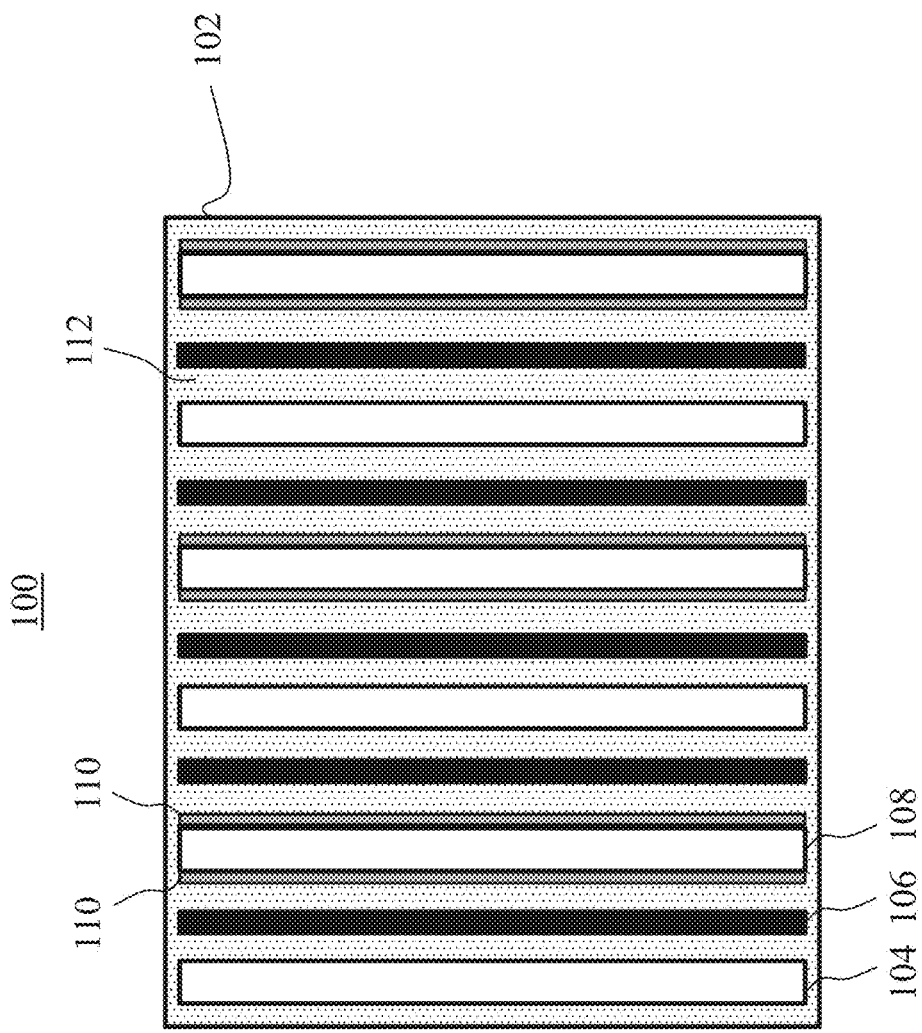
FIG. 1 illustrates a cross-section of an electrolytic capacitor or battery.

FIG. 1 illustrates a cross-section view of an electronic component 100. Electronic component 100 includes a housing 102 that contains a plurality of cathodes 104 alternating with a plurality of anodes 108, and separated by a plurality of separators 106. Each anode 108 includes a dielectric material 110 on or around an outer surface of anode 108. Dielectric material 110 may be an oxide that is thermally grown on, or deposited onto, the surface of anode 108. A high-k dielectric material may be used for dielectric material 110. A conductive electrolyte 112 fills the space between each of the elements within housing 102. Electrolyte 112 may be a polymer or liquid electrolyte as would be understood to one skilled in the art. Example electrolytes include ethylene glycol/boric acid based electrolytes and anhydrous electrolytes based on organic solvents such as dimethylformamide (DMF), dimethylacetamide (DMA), or gamma-butyrolactone (GBL). The plurality of cathodes 104 may be electrically connected to a single, common cathode terminal, while the plurality of anodes 108 may be similarly connected to a single, common anode terminal.

Electronic component 100 may be, for example, an electrolytic capacitor or a battery. When electronic component 100 is used as a capacitor, example materials for plurality of cathodes 104 include aluminum, titanium, stainless steel, while example materials for plurality of anodes 108 include aluminum and tantalum. When electronic component 100 is used as a battery, example materials for plurality of cathodes 104 include silver vanadium oxide, carbon fluoride, magnesium oxide, or any combination thereof, while example materials for plurality of anodes 108 include lithium metal.

Spacer 106 may be provided to maintain a given separation between each cathode 104 and an adjacent anode 108 within housing 102. Additionally, spacer 106 may be provided to prevent arcing between cathode 104 and anode 108 in spaces where dielectric 110 may be very thin or nonexistent, and/or where a void within electrolyte 112 exists between cathode 104 and anode 108.

Plurality of cathodes 104, plurality of anodes 108, and spacer 106 form a material stack. This material stack is typically aligned within housing 102 such that it does not come into contact with the edges of housing 102 (and risk shorting the electrodes on the conductive housing 102). As such, the space within housing 102 is not fully utilized by the material stack.

It should be understood that the various elements and dimensions of electronic component 100 are not drawn to scale. Although each of capacitor 104, separator 106, and anode 108 are illustrated as being apart from one another for the convenience of illustration and labeling, it would be understood by one skilled in the art that such elements may also be stacked together in close physical contact with one another.

Figure 2:
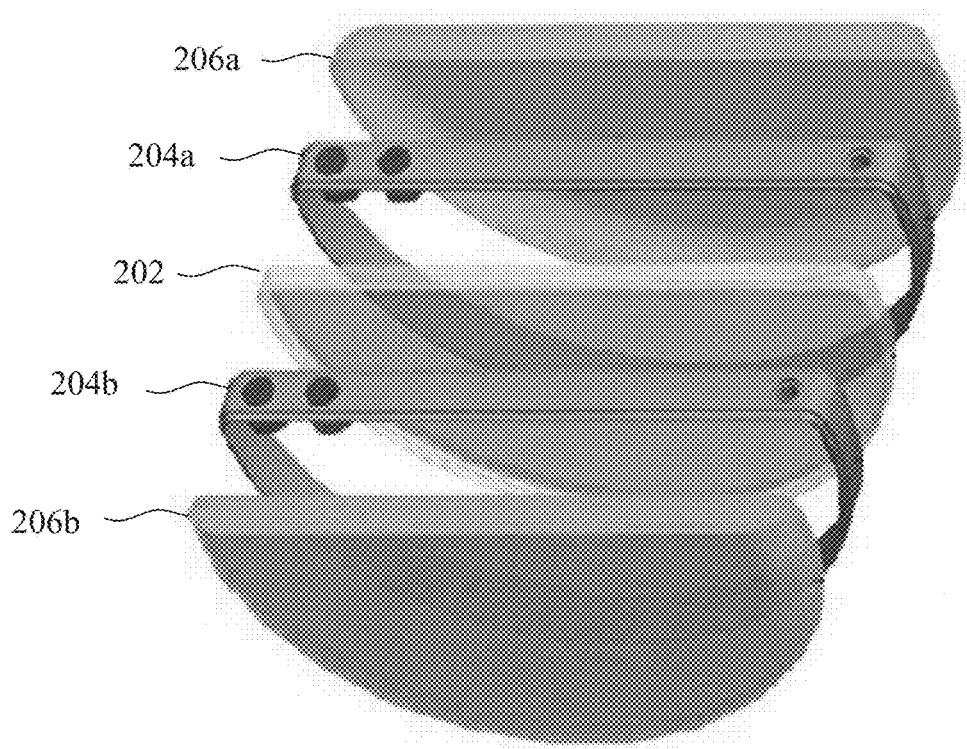
FIG. 2 is a three dimensional exploded view showing the various components of a capacitor case, according to an embodiment.

FIG. 2 is a three-dimensional exploded view showing various components of a capacitor housing 200, according to an embodiment. Each component of capacitor housing 200 includes a non-conductive material, such as any suitable thermoplastic resin. For example, each component of capacitor housing 200 may be molded using polyether ether ketone (PEEK). Other example thermoplastic resins include ethylene chlorotrifluoroethylene (ECTFE), polyvinylidene fluoride (PVDF), and polytetrafluoroethylene (PTFE). In another example, each component of capacitor housing 200 is coated with an insulating material, such as any plastic material.

Capacitor housing 200 has a design that allows for two different capacitors to be included in the same case. According to an embodiment, a plate 202 provides the central dividing feature of capacitor housing 200. A ring component 204a couples to a surface of plate 202, while another ring component 204b couples to an opposite surface of plate 202. Then, the casing for a first of the capacitors is capped via a cover 206a coupling to ring component 204a, and the casing for a second of the capacitors is capped via a cover 206b coupling to ring component 204b. In this way, the first capacitor is encapsulated by each of plate 202, ring component 204a and cover 206a, while the second capacitor is encapsulated by plate 202, ring component 204b and cover 206b. Not shown in this illustration are the material stacks that include the anode and cathode foils that would be disposed on each side of capacitor housing 200 to form the capacitor electrodes.

According to an embodiment, the material stack on either side of capacitor housing 200 may extend up to and even touch the components of capacitor housing 200. This is because the components of capacitor housing 200 are non-conductive. By allowing the material stack of anodes and cathodes to effectively "fill" the space within the case, the energy density of the capacitors may be increased by as much as 10%. For example, the energy density may be increased by between 0.5 J/cc and 0.75 J/cc. The energy density may ultimately be around 6.5 J/cc. Additionally, because housing 200 is non-conductive, the capacitor or capacitor pair may be placed within a device, such as an ICD, without needing additional insulation around the outside of the housing.

According to an embodiment, each component of housing 200 is coupled to an adjacent component via patterned grooves. For example, ring component 204a/204b couples to cover 206a/206b via a patterned groove on the surface, which includes a peripheral edge, of cover 206a/206b, and ring component 204a/204b couples to plate 202 via patterned grooves on the surfaces of plate 202. This coupling mechanism may allow the components to snap together.

Figure 3:
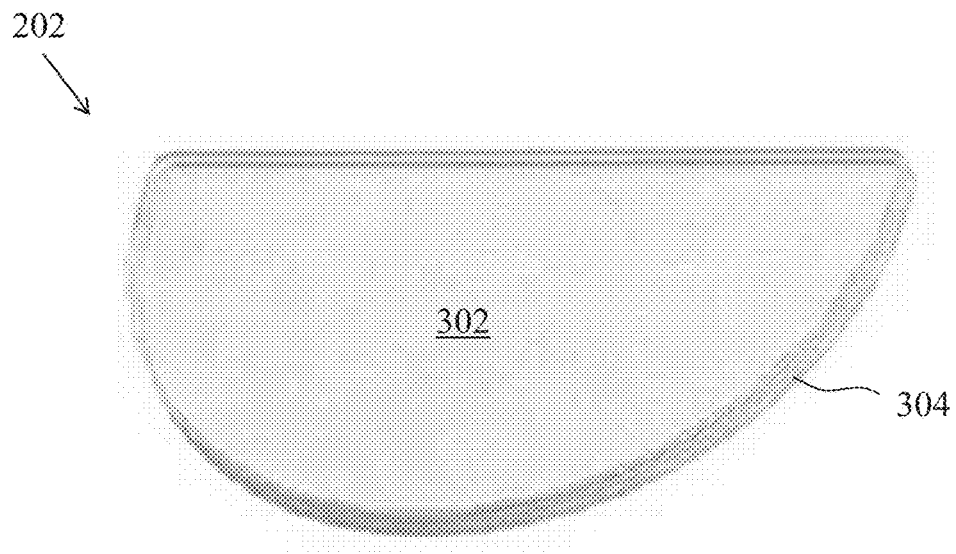
FIG. 3 illustrates a component of the capacitor case, according to an embodiment.

FIG. 3 illustrates plate 202, according to an embodiment. Plate 202 has a primary surface 302 that is non-conductive. Primary surface 302 may be a suitable thermoplastic resin, such as PEEK. According to an embodiment, primary surface 302 includes a patterned groove 304 that extends around an outside edge of primary surface 302. Primary surface 302 may remain substantially flat everywhere except at patterned groove 304. Patterned groove 304 may have the form of any known shape designed to mate with another component such that plate 202 mechanically couples with the other component. In one example, ring component 204a/204b couples with plate 202 via patterned groove 304. Patterned groove 304 may simply be a recess, or may have a more complex shape that allows for another component to "hook" or "snap" into the groove. One example of this is described in more detail later with reference to FIG. 7.

Figure 4:
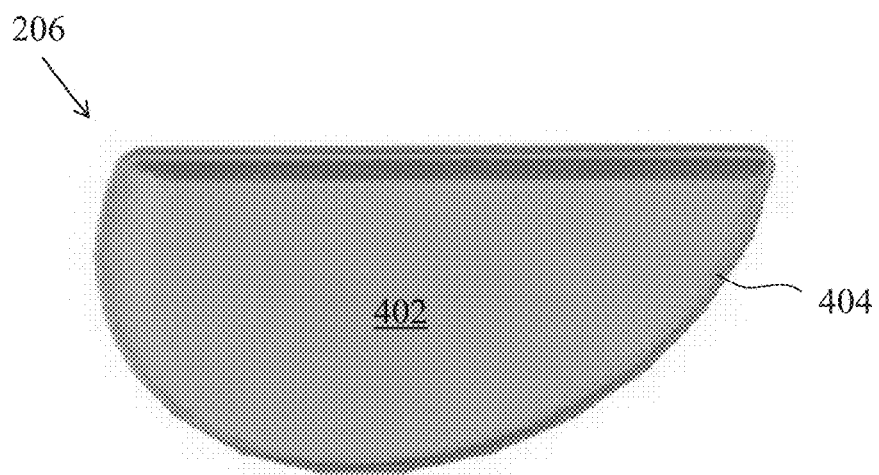
FIG. 4 illustrates a component of the capacitor case, according to an embodiment.

FIG. 4 illustrates cover 206 (as it represents either cover 206a or cover 206b), according to an embodiment. Cover 206 has a primary surface 402 that is non-conductive. Primary surface 402 may be a suitable thermoplastic resin, such as PEEK. According to an embodiment, primary surface 402 includes a patterned groove 404 that extends around an outside edge of primary surface 402. Primary surface 402 may be mostly flat, but curves inwards near the edges of cover 206 where patterned groove 404 is located. Patterned groove 404 may have the form of any known shape designed to mate with another component such that cover 206 mechanically couples with the other component. In one example, ring component 204a/204b couples with cover 206 via patterned groove 404. Patterned groove 404 may simply be a recess, or may have a more complex shape that allows for another component to "hook" or "snap" into the groove. One example of this is described in more detail later with reference to FIG. 7.

Figure 5:
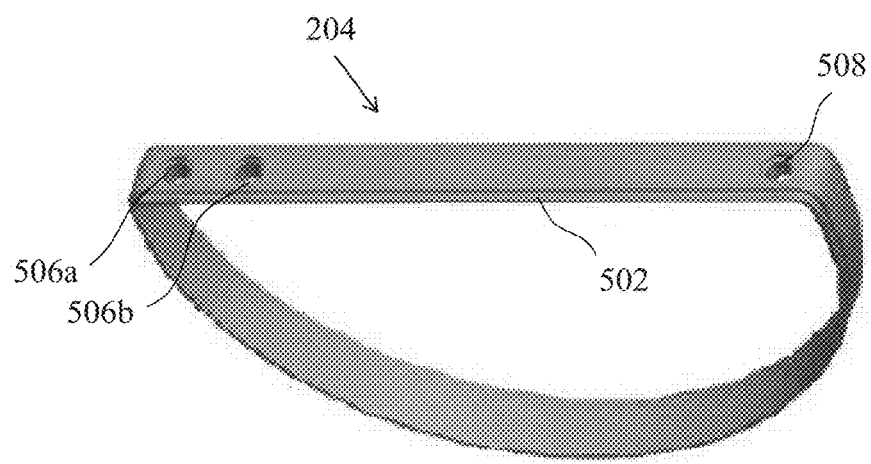
FIG. 5 illustrates a component of the capacitor case, according to an embodiment.

FIG. 5 illustrates ring component 204 (as it represents either ring component 204a or ring component 204b), according to an embodiment. Ring component 204 may be formed from a suitable thermoplastic resin, such as PEEK. Ring component 204 may also include a patterned groove 502 that extends around a perimeter of ring component 204. Patterned groove 502 may have the form of any known shape designed to mate with another component such that ring component 204 mechanically couples with the other component. In an embodiment, patterned groove 502 is shaped such that it "hooks" or "snaps" into place when pressed against either patterned groove 304 of plate 202 or patterned groove 404 of cover 206. Ring component 204 may also have another patterned groove (not shown) along a perimeter edge on the other side from the edge that has patterned groove 502.

According to an embodiment, ring component 204 includes at least three openings that extend through a thickness of ring component 204. Opening 506a and opening 506b may be configured to receive an electrical feed-thru to allow electrical contact with the anode and cathode of the capacitor to be made through ring component 204. Although openings 506a and 506b are illustrated close to one another, this is not required, and the openings may be located anywhere around ring component 204. Another opening 508 may be provided to allow an electrolyte to be introduced into the enclosed housing after the various components have been coupled together.

Figure 6:
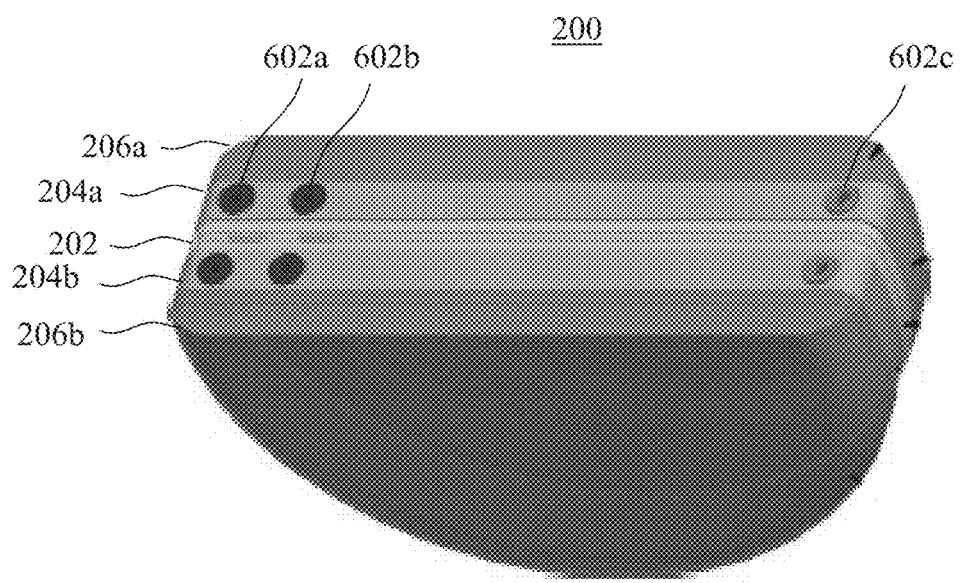
FIG. 6 is a three dimensional view of the capacitor case after assembly, according to an embodiment.

FIG. 6 illustrates a view of capacitor housing 200 after each component has been coupled together, according to an embodiment. Plate 202, ring component 204a, and cover 206a form an enclosure around a first capacitor while plate 202, ring component 204b, and cover 206b form an enclosure around a second capacitor. Each of the first and second capacitors includes a material stack of anode and cathode foils disposed within the housing. The seams between all coupled components may be sealed using a variety of different methods. For example, the seams may be sealed using laser welding or ultrasonic bonding. In another example, the seams may be sealed using an epoxy or adhesive, such as ethyl cyanoacrylate. Whatever adhesive is used, the adhesive should preferably not contain any halides or chlorides as these compounds can react with the aluminum foil and cause corrosion.

FIG. 6 also illustrates that each of the openings is sealed using a polymer plug 602a-602c. In one embodiment, plugs 602a and 602b seal around an electrical feed-thru that may include a wire or some other conductive structure such that electrical contact is still made through openings 506a and 506b. According to another embodiment, the various openings may be located through any of the coupled components, not only through ring component 204.

Figure 7:
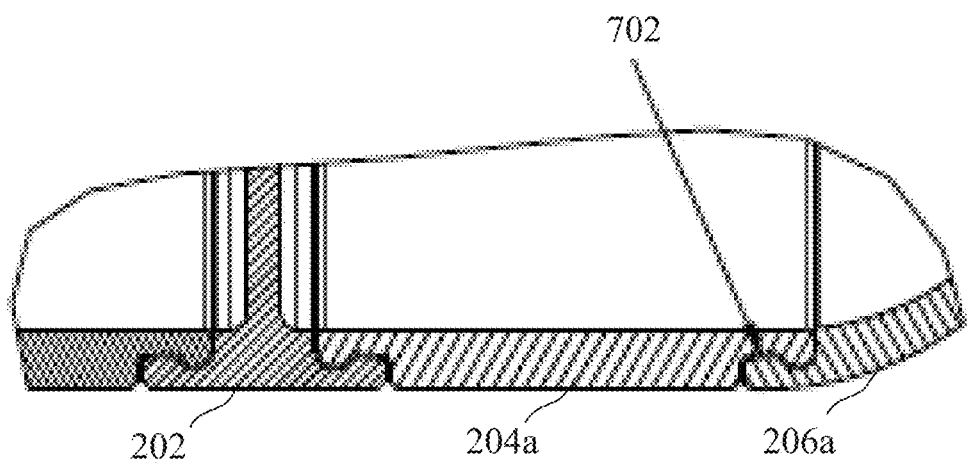
FIG. 7 is a cross-sectional cutaway view showing the coupling between components of the capacitor case, according to an embodiment.

FIG. 7 is a cross-sectional cutaway view showing the coupling between plate 202, ring component 204a, and cover 206a, according to an embodiment. It should be noted that a similar coupling would be performed between plate 202, ring component 204b and cover 206b. As shown in FIG. 7, ring component 204a and cover 206a couple together at an interface 702. Due to the shape of the patterned grooves on each of ring component 204a and cover 206a, the components "snap" together at interface 702. This same type of interface is also used between ring component 204a and plate 202. In an embodiment, an epoxy or other type of adhesive is used at each interface 702 to form a strong bond between ring component 204a and cover 206a, and similarly between ring component 204a and plate 202. Other sealing techniques may be used as well, including laser welding or ultrasonic bonding to name a few examples.

Figure 8:
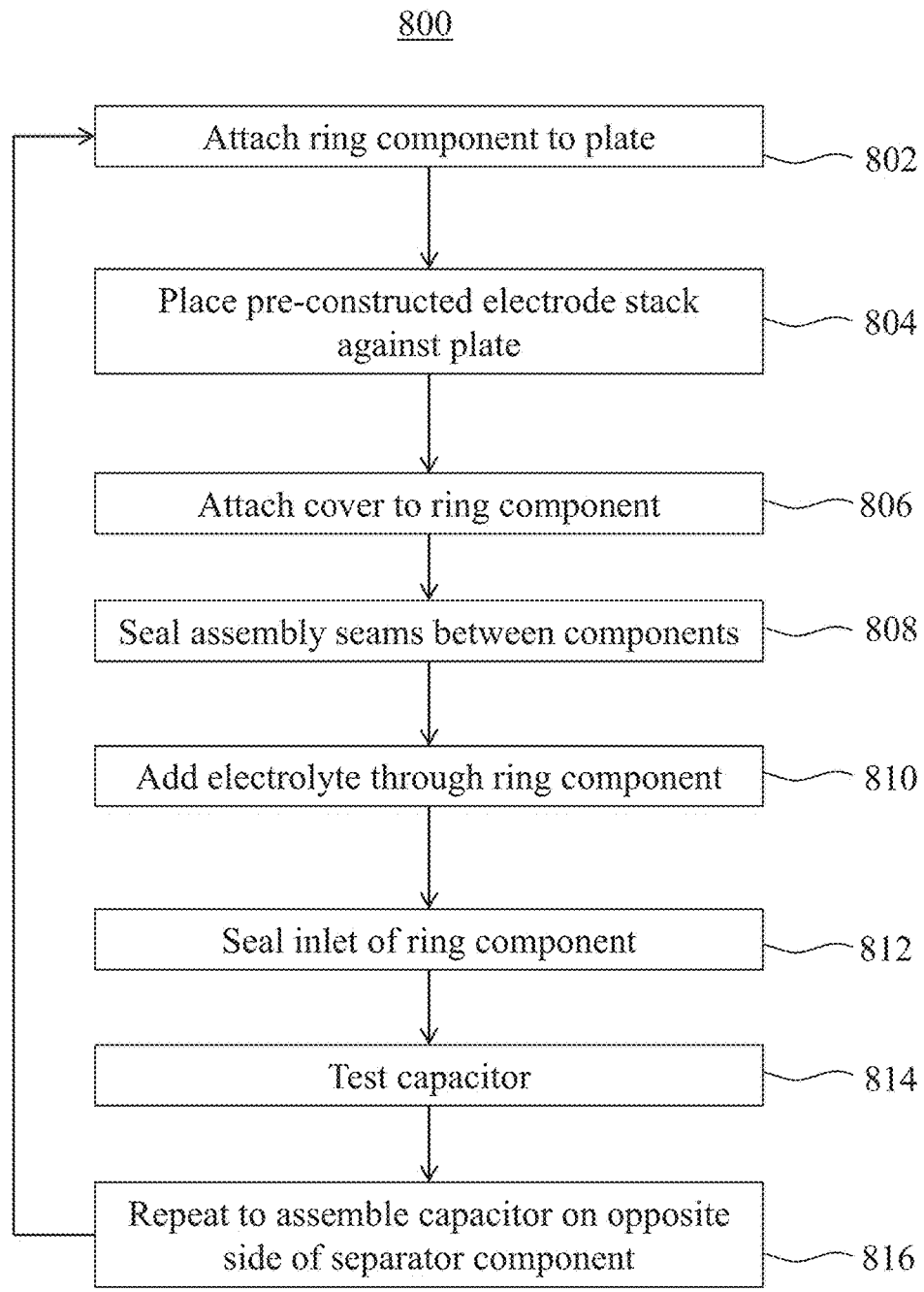
FIG. 8 is a flow chart of a method of assembling a capacitor case, according to an embodiment.

FIG. 8 is a flow chart of an example method for assembling and testing one or more capacitors. Other steps may be performed between those illustrated, and the various steps illustrated may not be performed in the exact order shown.

Method 800 begins at block 802 where a ring component is attached to a plate. Each of the components may be formed from a non-conductive material. The components may be attached via patterned grooves present on one or both of the components.

At block 804, a pre-constructed electrode stack is disposed against the plate, and within the ring component. The electrode stack may include one or more anode foils, one or more cathode foils, and one or more separator sheets between adjacent anode and cathode foils.

At block 806, a cover is attached to the ring component such that the electrode stack is enclosed within the cover, ring component, and plate. The cover may also be formed from a non-conductive material and attached to the ring component via patterned grooves present on one or both of the components.

At block 808, the assembled capacitor is sealed at the seams between the various components. The sealing may be performed via laser welding, ultrasonic bonding, or application of epoxy or any other adhesive material that preferably does not contain halides or chlorides.

At block 810, an electrolyte is added via an opening through the ring component. The electrolyte may be a polymer or liquid electrolyte as would be understood to one skilled in the art. Example electrolytes include ethylene glycol/boric acid based electrolytes and anhydrous electrolytes based on organic solvents such as dimethylformamide (DMF), dimethylacetamide (DMA), or gamma-butyrolactone (GBL).

At block 812 the inlet through which the electrolyte entered is sealed using any known sealing method. In one example, a polymer plug is used to seal the opening.

At block 814 the capacitor is ready to be tested via any number of charge/discharge cycles. Electrical connection to the anode and cathode may be made via two openings (one for anode and one for cathode) through the housing as described above.

At block 816 the steps may be repeated starting at block 802 to construct another capacitor on the opposite surface of the plate. Once both capacitors are constructed, they may be tested and used in series resulting in a storage voltage between about 800 volts and 950 volts, based on the size of the capacitors.

It is to be appreciated that the Detailed Description section, and not the Summary and Abstract sections, is intended to be used to interpret the claims. The Summary and Abstract sections may set forth one or more but not all exemplary embodiments of the present system and method as contemplated by the inventors, and thus, are not intended to limit the present method and system and the appended claims in any way.

Moreover, while various embodiments of the present system and method have been described above, it should be understood that they have been presented by way of example, and not limitation. It will be apparent to persons skilled in the relevant art(s) that various changes in form and detail can be made therein without departing from the spirit and scope of the present system and method. Thus, the present system and method should not be limited by any of the above described exemplary embodiments, but should be defined only in accordance with the following claims and their equivalents.

In addition, it should be understood that the figures, which highlight the functionality and advantages of the present system and method, are presented for example purposes only. Moreover, the steps indicated in the exemplary system(s) and method(s) described above may in some cases be performed in a different order than the order described, and some steps may be added, modified, or removed, without departing from the spirit and scope of the present system and method.

What is claimed is:

1. A case for an electrolytic capacitor, comprising:
    a first housing defining a first space for enclosing a capacitor, the first housing including
        a first non-conducting cover;
        a first non-conducting ring component having a shape that is substantially the same as a shape of the first non-conducting cover, wherein the first non-conducting ring component is coupled to the first non-conducting cover;
        a non-conducting plate having a shape that is substantially the same as the shape of the first non-conducting cover, wherein the first non-conducting ring component is coupled to the non-conducting plate; and
        a single capacitor arranged in the first space; and
    a second housing defining a second space for enclosing a capacitor, the second housing including
        a second non-conducting ring component having a shape that is substantially the same as the shape of the first non-conducting cover, wherein the second non-conducting ring component is coupled to the non-conducting plate on an opposite surface from the first non-conducting ring component;
        a second non-conducting cover coupled to the second non-conducting ring component; and
        another single capacitor arranged in the second space;
    wherein the non-conducting plate is positioned between the first space and the second space.

2. The case of claim 1,
    wherein the first non-conducting ring component is coupled to the non-conducting plate via a first patterned groove on a first surface of the non-conducting plate; and
    wherein the second non-conducting ring component is coupled to the non-conducting plate via a second patterned groove on a second surface of the non-conducting plate opposite the first surface.

3. The case of claim 1, wherein the first non-conducting ring component includes at least three separate openings through a thickness of the first non-conducting ring component.

4. The case of claim 3, wherein the second non-conducting ring component includes at least three separate openings through a thickness thereof.

5. The case of claim 1, wherein the first non-conducting cover has a patterned groove on a surface thereof and the non-conducting plate has a patterned groove on a surface thereof, and the patterned groove of the first non-conducting cover and the patterned groove of the non-conducting plate are designed such that the first non-conducting ring component snaps into each of the first non-conducting cover and the non-conducting plate.

6. The case of claim 5, wherein the first non-conducting ring component includes a first patterned groove along a first edge thereof that snaps into the patterned groove of the first non-conducting cover, and the first non-conducting ring component includes a second patterned groove along a second edge thereof opposite the first edge that snaps into the patterned groove of the non-conducting plate.

7. The case of claim 1, wherein seams between each of the first non-conducting cover, the first non-conducting ring component, and the non-conducting plate are sealed with an adhesive.

8. The case of claim 7, wherein the adhesive does not include any halides or chlorides.

9. The case of claim 1, where each of the first non-conducting cover, the first non-conducting ring component, the non-conducting plate, the second non-conducting ring component and the second non-conducting cover are molded from a thermoplastic resin.

10. The case of claim 1, wherein the first housing and the second housing are molded using polyether ether ketone.

11. The case of claim 1, wherein the non-conducting first cover has a patterned groove on a surface thereof.

12. An electrolytic capacitor, comprising:
    a case comprising:
        a first non-conducting cover having a patterned groove on a surface thereof;
        a first non-conducting ring component having a shape that is substantially the same as a shape of the first non-conducting cover, wherein the first non-conducting ring component is coupled to the first non-conducting cover via the patterned groove of the first non-conducting cover;
        a non-conducting plate having a first patterned groove on a first surface thereof and a second patterned groove on a second surface thereof opposite the first surface, the non-conducting plate having a shape that is substantially the same as the shape of the first non-conducting cover, wherein the first non-conducting ring component is coupled to a first side of the non-conducting plate via the first patterned groove of the non-conducting plate;
        a second non-conducting cover having a patterned groove on a surface thereof; and a second non-conducting ring component coupled to the second non-conducting cover and having a shape that is substantially the same as a shape of the second non-conducting cover, wherein the second non-conducting ring component is coupled to a second side of the non-conducting plate via the second patterned groove of the non-conducting plate;

an electrolyte; and two material stacks, each comprising:

at least one anode foil;

at least one cathode foil; and at least one separator disposed between the anode foil and the cathode foils;

wherein one portion of the electrolyte and a single one of the material stacks are disposed within the first non-conducting ring component and another portion of the electrolyte and another single one of the material stacks are disposed within the second non-conducting ring component.

13. The electrolytic capacitor of claim 12, wherein the first non-conducting ring component and the second non-conducting ring component each includes at least three separate openings through a thickness thereof.

14. The electrolytic capacitor of claim 13, wherein one of the at least three separate openings is configured to introduce the electrolyte into the case.

15. The electrolytic capacitor of claim 13, wherein two of the at least three separate openings are configured to provide electrical connection with the at least one anode foil and the at least one cathode foil.

16. A method of assembling an electrolytic capacitor, comprising:

coupling a first non-conducting ring component to a first side of a non-conducting plate;

disposing a first single material stack within the first ring component, wherein the first single material stack is disposed against the non-conducting plate;

attaching a non-conducting first cover to the first ring component to enclose the first material stack within a first space;

coupling a second non-conducting ring component to a second side of the non-conducting plate opposite the first side;

disposing a second single material stack within the second ring component, wherein the second single material stack is disposed against the non-conducting plate;

attaching a non-conducting second cover to the second ring component to enclose the second material stack within a second space to form a capacitor assembly;

sealing seams in the capacitor assembly; and adding electrolyte to the first space and the second space through the first and second ring components.

17. The method of claim 16, wherein the non-conducting plate is formed by molding polyether ether ketone.

18. The method of claim 16, wherein the attaching of the first cover to the first ring component comprises snapping one into a groove of the other.

19. The method of claim 16, wherein the sealing comprises sealing seams between each of the non-conducting first cover, the first non-conducting ring component, the non-conducting plate, the non-conducting second cover, and the second non-conducting ring component using an adhesive.

20. The method of claim 19, wherein the adhesive does not include any halides or chlorides.

21. The method of claim 16, further comprising, after adding the electrolyte, testing the assembled capacitor in series resulting in a storage voltage between about 800 volts and about 950 volts.

22. The method of claim 16, further comprising adding at least one of a foil or a separator within the respective first and second material stacks.

* * * * *